F. HICKMAN.
CUSHION TIRE.
APPLICATION FILED MAY 2, 1917.
1,244,209.
Patented Oct. 23, 1917.
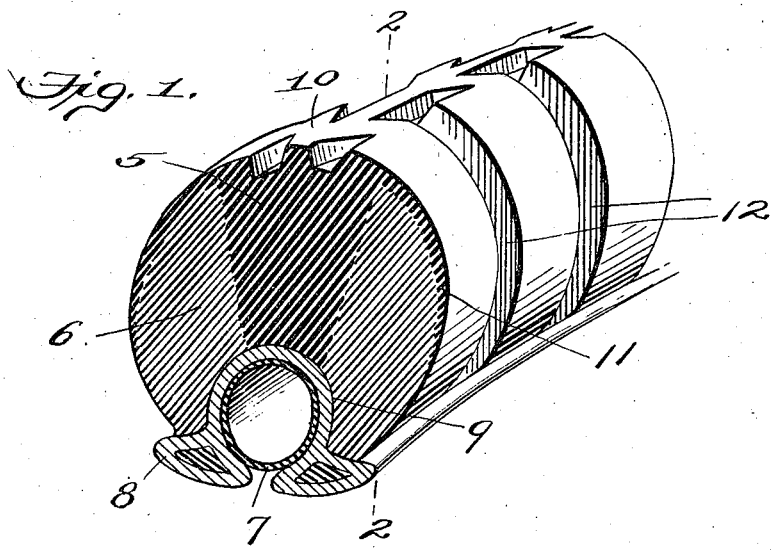
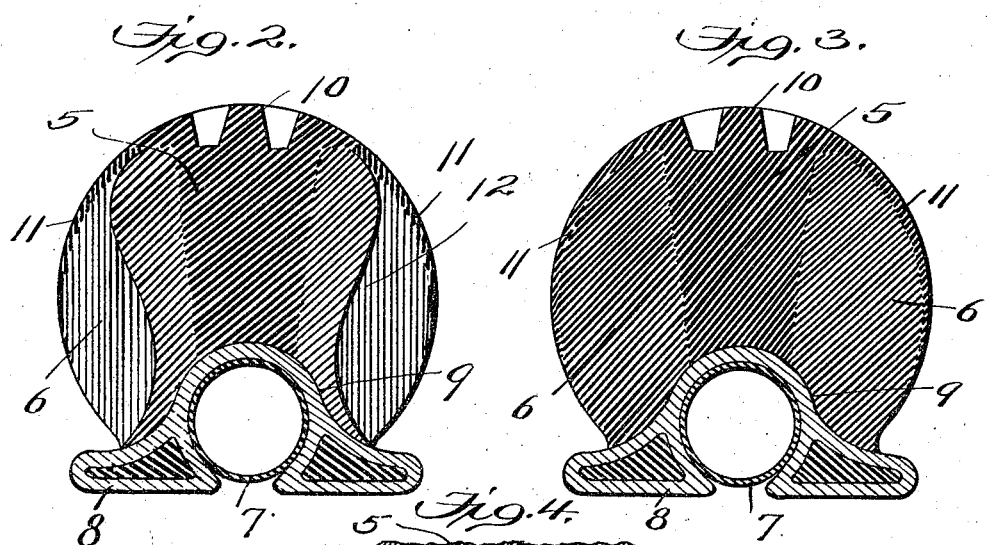
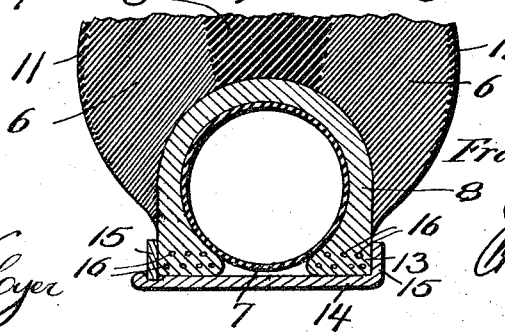
Witness
C. D. Kesler
Chas. S. Hayer
Inventor
Francis Hickman
Attorney

UNITED STATES PATENT OFFICE.

FRANCIS HICKMAN, OF BOUNDBROOK, NEW JERSEY, ASSIGNOR OF ONE-HALF TO BOUND BROOK OIL-LESS BEARING COMPANY, OF BOUNDBROOK, NEW JERSEY, A CORPORATION OF NEW JERSEY.

CUSHION-TIRE.

1,244,209.

Specification of Letters Patent.

Patented Oct. 23, 1917.

Application filed May 2, 1917. Serial No. 165,969.

*To all whom it may concern:*

Be it known that I, FRANCIS HICKMAN, a citizen of the United States, residing at Boundbrook, in the county of Somerset and State of New Jersey, have invented new and useful Improvements in Cushion-Tires, of which the following is a specification.

This invention relates to cushion tires, and the primary object of the same is to provide a partially solid and partially pneumatic tire in one organization and dispense with the use of a shoe or clencher and as a consequence reduce the liability of puncture and blow-out to a minimum by eliminating all parts that might have movement relatively to each other and thus avoid frictionally generated heat within the body of the tire and between the latter and the rim to which the tire is applied. A further object of the invention is to materially reduce the cost of manufacture of tires and at the same time increase the wearing qualities thereof and also to produce a tire that is adaptable to any form of rim, either of the clencher or straight side type; and one that may be very easily applied by reason of similarity in construction thereof to the usual shoe or clencher.

The improved cushion tire comprises components having different degrees of resilient action, but practically of integral structure, the component of less resiliency continuing directly from the tread or anti-skid means of the tire to an inclosed pneumatic element and between opposite side portions of the component of greater resiliency and whereby a direct pressure action between the tread or anti-skid means which is integral with the component of lesser resilient action and the pneumatic element is provided. The component of lesser resilient action in a preferred specific construction partially covers or extends over the outer portion of the component of greater resilient action to shield or protect the latter, but at the same time permit a sensitive action of the said component having greater resiliency during the operation of the tire. The invention also consists in the details of construction and arrangement of the several parts which will be more fully hereinafter described and claimed.

In the drawing:

Figure 1 is a sectional perspective view of a portion of the tire embodying the features of the invention.

Fig. 2 is a transverse vertical section taken in the plane of the line 2—2, Fig. 1.

Fig. 3 is a view similar to Fig. 2 showing a slight modification.

Fig. 4 is a partial transverse vertical section of the improved tire showing the same adapted to a rim with straight sides.

The tire as shown by Figs. 1 and 2 is composed of a solid portion comprising components 5 and 6 and a pneumatic component embodying a tube 7 of usual inflatable form, and a shoe or casing 8 of usual fabric and rubber construction and provided with the usual means for association with the opposite flanged sides of a rim. The component 5 is preferably formed of rubber which is vulcanized slightly harder than the components 6 and is therefore less resilient than the latter components. The component 5 is also preferably of the form shown and extends fully from the tread portion of the wheel inwardly to the shoe or casing 8 in which the inflatable tube 7 is mounted. The components 5 and 6 have their inner central portions longitudinally recessed, as at 9, to snugly receive the shoe or casing 8, and in the preliminary construction of the improved tire the components 5 and 6 after their preparation will be joined by ordinary methods to render them practically integral. It will therefore be understood that the solid portion of the tire is made up or composed of three components or elements, one of which is less elastic than the other two, the less elastic component continuing from the tread portion of the tire fully inwardly to and engaging the outer central portion of the shoe or casing 8 with the remaining components 6 flanking the opposite sides of the component 5. The components 6 will readily yield and laterally expand, or will give or move outwardly when the tire is under weight stress during its operation in conjunction with a vehicle wheel. The component 5, which is less resilient than the components 6, is shown as integrally formed with an outer tread or anti-skid means 10 which may be of any preferred form, and said component is continued inwardly in gradually merging extensions 11 over the oppositely side portions of the components 6 to protect or shield the latter and without interfering with the requisite resiliency of the members or parts of the components 6. This arrangement insures stronger wearing qualities, especially in view of the fact that the improved tire is not inclosed by a casing or shoe. The converging extensions 11 are also practically integral with the opposite members of the components 6 and at intervals throughout the length of said components 6 side recesses 12 are formed, and the converging extensions 11 cover the greater portions of the ribs thus formed throughout the length of the tire. The object of forming the recesses 12 is to economize in the use of material and also to increase the sensitive resilient action of the components 6. This recessed construction, however, is not absolutely necessary in the effective operation of the tire, as in the modification shown by Fig. 3 the components 6 are continuous or are formed without the recesses 12 and the extensions 11 continue inwardly in converging planes over the greater portions of the components 6. In the modified form shown by Fig. 4 the casing 8 is shaped at the ends or formed more nearly straight, as at 13, to adapt the said casing to attachment to or engagement with a rim 14 having straight sides 15, reinforcing wires or other analogous devices 16 being inserted in and extending longitudinally through the said ends 13.

The main advantage of the foregoing structure in its various forms is that the component 5, which has less resiliency than the components 6 that directly acts on the pneumatic element embodying the tube 7 and shoe or casing 8 and the tread or antiskidding part 10 of the said component 5 which is comparatively hard or unyielding, is materially affected by the cushioning action of the pneumatic element and the wheel embodying the improved tire is thus given an advantage as a whole in the operation thereof and at the same time the pneumatic element is so located and protected that it will not be liable to puncture or blow-outs and the durability of the tire is materially increased, with a consequent reduction in the expense of devices of this class. The improved cushion tire as a whole is sufficiently resilient to provide the necessary yielding tractive effect relatively to a road surface and the components 5 and 6 may be readily assembled or associated by any of the known methods now commonly practised.

What is claimed as new is:

1. A tire comprising joined solid cushion elements and a pneumatic element inclosed by the cushion elements, the one cushion element being between and of less resiliency than the other cushion elements and extending fully from the tread of the tire to the said pneumatic element.

2. A tire comprising joined solid cushion elements and a pneumatic element inclosed by the cushion elements and located adjacent to the rim engaging portion of the tire, the one cushion element being of less resiliency than the other cushion elements and mainly inclosed between the latter elements and extending continuously from the tread of the tire to the said pneumatic element.

3. A tire comprising joined solid cushion elements and a pneumatic element inclosed by the cushion elements and located adjacent to the rim engaging portion of the tire, the one cushion element being of less resiliency than the other elements and mainly inclosed by the said elements of greater resiliency and serving as the tread of the tire and extending continuously to and engaging the pneumatic element, the cushion elements of greater resiliency being shielded by parts of the said cushion element of lesser resiliency.

4. A cushion tire comprising joined solid cushion elements and a pneumatic element inclosed by the former elements, the one cushion element being of less resiliency than the other cushion elements and continuously interposed between the tread portion of the tire and the said pneumatic element, the cushion elements of greater resilience being reduced in thickness at intervals at opposite sides of the tire.

5. A tire comprising practically integral solid cushion elements and a pneumatic element inclosed by the former elements, the one cushion element being within and of less resiliency than the other cushion elements and exposed to form the tread of the tire and extending fully from the tire tread to the said pneumatic element, the cushion elements of greater resiliency being formed with recesses at regular intervals throughout the length of the tire and the parts of the tire between the recesses being partially covered by portions of the cushion element of less resiliency.

In testimony whereof I have hereunto set my hand in presence of two subscribing witnesses.

FRANCIS HICKMAN.

Witnesses:
 CHAS. S. HYER,
 S. E. WHITE.